US007639660B2

(12) United States Patent
Kim et al.

(10) Patent No.: US 7,639,660 B2
(45) Date of Patent: Dec. 29, 2009

(54) APPARATUS FOR OFDMA TRANSMISSION AND RECEPTION FOR COHERENT DETECTION IN UPLINK OF WIRELESS COMMUNICATION SYSTEM AND METHOD THEREOF

(75) Inventors: Yun-Hee Kim, Daejeon (KR); Kwang-Soon Kim, Daejeon (KR); Jae-Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 575 days.

(21) Appl. No.: 10/941,197

(22) Filed: Sep. 14, 2004

(65) Prior Publication Data

US 2005/0135324 A1 Jun. 23, 2005

(30) Foreign Application Priority Data

Dec. 17, 2003 (KR) ...................... 10-2003-0092313

(51) Int. Cl.
*H04J 1/00* (2006.01)
(52) U.S. Cl. ...................... 370/343; 370/347; 370/328; 370/329; 370/477; 370/436; 370/341; 370/331; 370/208; 370/445; 455/450; 455/452.2; 455/433; 455/436; 455/445; 375/260; 375/130; 375/316; 375/349; 375/225
(58) Field of Classification Search ................. 370/345, 370/349, 344, 343, 204, 347, 503, 328, 329, 370/477, 236, 278, 436, 341, 331, 208, 310, 370/445, 252, 342, 441; 375/132, 347, 130, 375/260; 455/421, 548, 450, 503, 521, 452.1, 455/432.3, 433, 436, 434, 445
See application file for complete search history.

(56) References Cited

U.S. PATENT DOCUMENTS

| 5,867,478 | A | 2/1999 | Baum et al. |
|---|---|---|---|
| 6,088,347 | A * | 7/2000 | Minn et al. ................ 370/342 |
| 6,169,898 | B1 * | 1/2001 | Hsu et al. ................ 455/432.3 |
| 6,188,717 | B1 * | 2/2001 | Kaiser et al. ................ 375/148 |
| 6,192,068 | B1 * | 2/2001 | Fattouche et al. ........... 375/130 |
| 6,263,029 | B1 * | 7/2001 | Alard et al. ................ 375/340 |

(Continued)

OTHER PUBLICATIONS

Ye (Geoffrey) Li, "Pilot-Symbol-Aided Channel Estimation for OFDM in Wireless Systems," IEEE Transactions on Vehicular Technology, vol. 49, No. 4, Jul. 2000 (1207-1215).

*Primary Examiner*—Rafael Pérez-Gutiérrez
*Assistant Examiner*—Joseph Arevalo
(74) *Attorney, Agent, or Firm*—Blakely, Sokoloff, Taylor & Zafman LLP

(57) ABSTRACT

In the resource mapping method for data transmission, a time-frequency resource of a slot interval including OFDM symbols is divided into traffic channels and shared among the subscribers, the traffic channel including resource blocks uniformly distributed in the whole transmit frequency band, the resource block including consecutive subcarriers of consecutive received symbols having at least one inserted pilot symbol. The pilot symbols and the channel-encoded and modulated data symbols are processed by time-frequency mapping according to the resource-block-based mapping method to generate received symbols. The receiver separates the received symbols by subscribers according to the resource-block-based mapping method in a frequency domain, and performs iterative channel estimation, demodulation, and decoding by using the pilot and a data reference value after decoding for each traffic channel.

20 Claims, 7 Drawing Sheets

U.S. PATENT DOCUMENTS

| | | | | |
|---|---|---|---|---|
| 6,320,897 B1 * | 11/2001 | Fattouche et al. | ............ | 375/130 |
| 6,327,314 B1 * | 12/2001 | Cimini et al. | ................ | 375/340 |
| 6,441,786 B1 * | 8/2002 | Jasper et al. | ................. | 342/383 |
| 6,473,418 B1 | 10/2002 | Laroia et al. | | |
| 6,647,078 B1 * | 11/2003 | Thomas et al. | ............... | 375/349 |
| 6,654,429 B1 * | 11/2003 | Li | ................................ | 375/316 |
| 6,751,187 B2 * | 6/2004 | Walton et al. | ............... | 370/210 |
| 6,768,713 B1 * | 7/2004 | Siala et al. | .................. | 370/203 |
| 6,771,706 B2 * | 8/2004 | Ling et al. | .................. | 375/267 |
| 6,795,489 B2 * | 9/2004 | Joshi et al. | ................... | 375/149 |
| 6,947,373 B2 * | 9/2005 | Siala et al. | ................... | 370/208 |
| 6,985,498 B2 * | 1/2006 | Laroia et al. | ................. | 370/478 |
| 7,042,858 B1 * | 5/2006 | Ma et al. | ..................... | 370/331 |
| 7,050,511 B2 * | 5/2006 | Jeong et al. | .................. | 375/301 |
| 7,068,628 B2 * | 6/2006 | Li et al. | ....................... | 370/334 |
| 7,133,354 B2 * | 11/2006 | Laroia et al. | ................. | 370/208 |
| 2003/0093747 A1 * | 5/2003 | Brouet et al. | ................ | 714/776 |
| 2003/0171116 A1 * | 9/2003 | Soomro | ....................... | 455/434 |
| 2004/0258170 A1 * | 12/2004 | Lin et al. | .................... | 375/260 |
| 2005/0190784 A1 * | 9/2005 | Stine | .......................... | 370/445 |

* cited by examiner

APPARATUS FOR OFDMA TRANSMISSION AND RECEPTION FOR COHERENT DETECTION IN UPLINK OF WIRELESS COMMUNICATION SYSTEM AND METHOD THEREOF

CROSS REFERENCE TO RELATED APPLICATION

This application claims priority to and the benefit of Korea Patent Application No. 2003-92313 filed on Dec. 17, 2003 in the Korean Intellectual Property Office, the entire content of which is incorporated herein by reference.

BACKGROUND OF THE INVENTION (a) Field of the Invention

The present invention relates to an apparatus for OFDMA (Orthogonal Frequency Division Multiple Access) transmission and reception, and a method thereof. More specifically, the present invention relates to an apparatus for OFDMA transmission and reception for coherent detection in the uplink of a wireless communication system, and a method thereof.

(b) Description of the Related Art

The conventional OFDM systems include DAB (Digital Audio Broadcasting) and DVB (Digital Video Broadcasting) systems providing continuous bit streams for broadcasting services, or IEEE 802.11a and HIPERLAN/2 systems providing packet services in fixed or low speed mobile environment. In each system, reference symbols such as pilot symbols or preambles are designed to be suitable to a specific environment, and a channel estimation scheme adequate to the reference symbols is used, so as to achieve coherent detection.

There has recently been suggested a method combining OFDM and spread spectrum multiple access so as to support a higher data rate for multiple subscribers and achieve the frequency reuse factor of one in the cellular environment. The typical examples of the combined method are a method of using spread sequences (U.S. Pat. No. 6,188,717), and a frequency hopping OFDMA method using a frequency hopping pattern that is different for each cell (U.S. Pat. No. 6,473,418).

The cited patent, U.S. Pat. No. 6,188,717 (Feb. 13, 2001) discloses "A method of simultaneous radio transmission of digital data between a plurality of subscriber stations and a base station", which is an OFDM-based multicarrier transmission and reception method for multiple subscriber stations that is applicable to both uplink and downlink of mobile communication systems. According to the cited patent, subscriber data are spread with orthogonal sequences and the spread data are overlapped and transmitted on allocated subcarriers. Here, there is no intersection of the subcarrier sets allocated to the respective subscriber stations and the allocated subcarriers are distributed in the whole band, so the channel estimation at the reception party is performed with a Wiener filter using reference symbols and the data are restored with a maximum likelihood sequence detector.

On the other hand, U.S. Pat. No. 6,473,418 (Oct. 29, 2002) discloses "An orthogonal frequency division multiplexing based spread spectrum multiple access". To provide an OFDM-based cellular system for the reduction of the intercell interference, the cited invention proposes a system combining OFDM and frequency hopping based multiple access so as for cellular uplink and downlink multiple access so as to provide a frequency reuse factor approximate to "1" without a complex cell planning.

Both the systems provide a multiple access method applicable to the uplink as well as the downlink.

The method of using spread sequences, where the subcarrier set allocated to subscriber stations is fixed, enables channel estimation with a time domain filter using periodically inserted pilot symbols. However, the method demands the use of an interference reduction method such as maximum likelihood sequence estimation due to the intercode interference during signal detection, and requires transmission of pilot symbols on the whole subcarriers allocated to each subscriber station in the uplink.

The frequency hopping OFDMA method, where the subscriber stations in the same cell share pilots in the downlink, enables channel estimation for the whole frequency band in the downlink by using a pilot structure and a channel estimation method applied to the conventional circuit mode OFDM systems such as DAB, DVB, etc.

In the uplink, each subscriber station is required to use different reference symbols or pilot symbols for independent channel estimation, and the method demands frequency hopping in the unit of a block comprising adjacent time/frequency resources correlated in their channel responses so as to reduce the overhead caused by the pilot symbols. But, the intercell interference averaging performance can be degraded when the frequency hopping unit is too large. Apart from the frequency hopping system, the OFDMA system that allocates resources for uniform distribution of multiple user data in the whole frequency band so as to achieve frequency diversity is also required to allocate resources in the same manner as the frequency hopping OFDMA system.

The most traditional method for acquiring channel information in the uplink is allocating subcarriers such as consecutive OFDM symbols to the subscribers and performing differential coding and detection in the time domain. But, this method also requires the use of a reference symbol, causes a 3 to 4 dB performance loss relative to coherent detection in uncoded cases, and results in an increased performance loss in coded cases.

In a method of inserting pilots in the resource block and using pilot symbols to perform channel estimation, a performance better than differential detection can be achieved only by increasing the pilot insertion rate and boosting the pilot transmission power. However, the increased pilot insertion rate causes a deterioration of the spectral efficiency and the boosted pilot transmission power increases the intercell interference as well as the power consumption in the subscriber equipments.

SUMMARY OF THE INVENTION

It is an advantage of the present invention to provide an apparatus for OFDMA transmission and reception for coherent detection in the uplink of a wireless communication system, and a method thereof that achieves frequency diversity over the whole transmission band to subscriber signals or intercell interference averaging, and enhances the channel estimation performance without boosting the pilot transmission power.

In one aspect of the present invention, there is provided an apparatus for OFDMA transmission, which is for coherent detection in an uplink of a wireless communication system supporting multiple subscribers, the apparatus including: a channel encoder for channel-encoding a subscriber data block; a symbol mapper for mapping encoded data of the channel encoder into a modulation symbol; a pilot symbol generator for generating a pilot of the same power as a data transmission power according to resource mapping based on a resource block comprising at least one pilot and multiple data; a resource-block-based time-frequency mapper for mapping a subscriber data symbol output from the symbol mapper and a pilot symbol generated from the pilot symbol generator into a time-frequency index of an OFDM signal according to a resource-block-based frequency hopping method; and an OFDM modulator for generating an OFDM signal from the mapped output of the resource-block-based time-frequency mapper.

In the resource mapping method, a time slot is composed of a plurality of OFDM symbols and is divided into a plurality of traffic channels shared by multiple subscribers. The traffic channel includes a plurality of resource blocks well-distributed in the time and the frequency domain of the slot. The resource mapping pattern of a traffic channel is based on the unit of a resource block and keeps being orthogonal to the resource mapping patterns of the other traffic channels in the same cell. A different resource mapping pattern is assigned to a traffic channel of an adjacent cell so as to average the intercell interference.

In another aspect of the present invention, there is provided an apparatus for OFDMA reception, which is for coherent detection in an uplink of a wireless communication system supporting multiple subscribers, the apparatus including: an OFDM demodulator for converting OFDM received symbols at respective antennas into frequency-domain received symbols; a resource-block-based time-frequency demapper for separating the frequency-domain received symbols of the OFDM demodulator by subscribers according to a resource mapping method for each subscriber, and rearranging the separated frequency-domain received symbols based on a resource block; a channel estimator for estimating a channel in the units of resource blocks based on the output of the resource-block-based time-frequency demapper; a demodulator for coherently calculating a channel decoding input metric by using the channel estimate of the channel estimator; and a channel decoder for performing channel decoding by using the calculated metric of the demodulator according to a channel encoding method.

In a first iteration, the channel estimator, the demodulator, and the channel decoder iterate their operations up to a maximum iteration count, when channel decoding is not successful or a channel decoding stop condition is not satisfied.

The channel estimator estimates, at a first iteration, the channel of a corresponding resource block by using solely instantaneous pilot channel estimates calculated by dividing the frequency-domain received pilot symbol outputs from the OFDM demodulator by known pilot symbols, and estimates, in subsequent iterations, the channel of the corresponding resource block by using both the instantaneous pilot channel estimates of the initial channel estimator in the resource block and the instantaneous data channel estimates calculated by using the decision symbols estimated from channel decoding decision bits.

The demodulator calculates the input metrics of the channel decoder by using the channel estimates, the estimated noise variance, and the received symbols. The input metric includes a weighted Euclidean distance or a log-likelihood ratio (LLR). When the input metric is calculated based on a posteriori probability (APP), the extrinsic information provided from the channel decoder can be used as a priori probability.

In case of using a single-pilot-based resource block having the pilot inserted in the center of the resource block, the channel estimator includes: an instantaneous pilot channel estimator for calculating an instantaneous pilot channel estimate; a symbol mapper for estimating transmit symbols from the output bits of the channel decoder; an instantaneous data channel estimator for calculating instantaneous data channel estimates by using the outputs of the symbol mapper; a weighted sum calculator for transmitting the instantaneous pilot channel estimate as a channel value of the resource block in a first iteration, and calculating a weighted sum in the resource block according to a refining channel estimation method in the subsequent iterations; and a noise variance estimator for calculating the noise variance of the received symbols in the resource block. The refining channel estimation method of the weighted sum calculator is selected from the group consisting of an average channel estimation method, a weighted average channel estimation method, a modified average channel estimation method, and a modified weighted average channel estimation method.

The noise variance estimator estimates, in a first iteration, the noise variance of the resource block using the known pilot symbols and the hard decision symbols detected with the received symbols and channel estimate outputs from weighted-sum calculator, and estimates, in the subsequent iterations, the noise variance of the resource block using the pilot symbols and the outputs of the reference symbol generator.

In case of using a resource block having multiple pilot symbols, the channel estimator includes: an instantaneous pilot channel estimator for calculating instantaneous pilot channel estimates; a channel parameter estimator for estimating the SNR and the channel variation rate of a received packet using the instantaneous pilot channel estimates; a filter coefficient memory and selector for selecting an initial filter coefficient matrix and a refining filter coefficient matrix with the outputs of the channel parameter estimator from the filter coefficient matrix set calculated and stored in advance according to given levels of SNR and channel variation rate; a reference symbol generator for estimating a transmit symbol from the decision bits of the channel decoder; an instantaneous data channel estimator for generating an instantaneous data channel estimate from the output of the reference symbol generator; a resource-block-based filter for performing a filtering operation in the unit of resource-block according to an initial filter coefficient matrix provided by the filter coefficient memory and selector, and a noise variance estimator for calculating the noise variance of the received symbols in the resource block.

The resource-block-based filter filters, in a first iteration, the output of the instantaneous pilot channel estimator in the unit of resource block according to the initial filter coefficient matrix provided by the filter coefficient memory and selector, and averages, in subsequent iterations, the outputs of the instantaneous pilot channel estimator and the instantaneous data channel estimator corresponding to a same time in the resource block and filters the averaged outputs according to the refining filter coefficient matrix provided by the filter coefficient memory and selector.

The noise variance estimator estimates, in a first iteration, the noise variance of the resource block using the known pilot symbols and the hard decision symbols detected with the received symbols and channel estimate outputs from the resource-block-based filter, and estimates, in the subsequent iterations, the noise variance of the resource block using the instantaneous channel pilot channel estimates and the outputs of the reference symbol generator.

In further another aspect of the present invention, there is provided a method for OFDMA transmission, which is for coherent detection in an uplink of a wireless communication system supporting multiple subscribers, the method including: (a) channel-encoding a subscriber data block; (b) mapping the encoded data into a modulation symbol; (c) generating a pilot symbol having the same power of a data transmission power according to a resource mapping based on a resource block comprising at least one pilot and multiple data; (d) mapping the symbol-mapped subscriber data symbol and the generated pilot symbol into a time-frequency index of an OFDM symbol according to a resource-block-based frequency hopping method; and (e) generating an OFDM signal from the output of the time-frequency mapping step and transmitting the generated OFDM signal.

In still another aspect of the present invention, there is provided a method for OFDMA reception, which is for coherent detection in an uplink of a wireless communication system supporting multiple subscribers, the method including: (a) converting OFDM received symbols at respective antennas into frequency-domain received symbols by OFDM demodulation; (b) separating the frequency-domain received symbols by subscribers according to a resource mapping method of each subscriber, and rearranging the separated frequency-domain received symbols based on a resource block by resource-block-based demapping; (c) estimating a channel in the units of resource block by using the output of the time-frequency demapping step; (d) coherently generating a channel decoding input metric from the received symbol, the estimated channel, the estimated noise variance by demodulation; (e) channel-decoding based on the generated metric according to a channel encoding method; and (f) determining whether to repeat a reception process when a decoding stop condition provided in the channel decoding step is not satisfied, or when a iteration count is less than a maximum iteration count.

In the reception method, the step (c) includes: (c-1) performing an initial channel estimation in a first iteration to estimate a channel of a corresponding resource block by using an instantaneous pilot channel estimate calculated by dividing a frequency-domain received pilot symbol of the time-frequency demapping step by a known pilot symbol, and to estimate a noise variance of a corresponding resource block by using both known pilot symbols and tentatively decided data symbols from received symbols and channel estimates; and (c-2) performing a refining channel estimation in subsequent iterations to estimate the channel of the corresponding resource block by using both the instantaneous pilot channel estimate in the resource block and an instantaneous data channel estimate calculated by using a data modulation symbol estimated from channel decoded bits and to estimate the noise variance of the corresponding resource block by using both pilot symbols and data symbols estimated from channel decoded bits.

When the traffic channel has resource blocks comprising multiple consecutive time-frequency resources almost without a variation of channel and has a single-pilot-based resource block having a pilot symbol inserted in the center of the resource block, the step (c-1) includes using the single instantaneous pilot channel estimate in the resource block as a data channel estimate in the resource block, and the step (c-2) includes estimating the data channel by using a weighted sum of the instantaneous pilot channel estimate and the instantaneous data channel estimate.

In this case, the step (c-2) includes estimating the data channel by an average channel estimation method of averaging all instantaneous channel estimates in the resource block, for the weighted sum. Alternatively, the step (c-2) includes estimating the data channel by a modified average channel estimation method of averaging all instantaneous channel estimates other than the instantaneous channel estimate of the data channel to be estimated, for the weighted sum.

Alternatively, the step (c-2) includes estimating the data channel by a weighted average channel estimation method of calculating the APP of a modulation symbol estimated from the APPs of the decision bits of the channel decoding step (e), adding the APP of a modulation symbol as an extra weight to the instantaneous channel estimate in the resource block, and averaging the weighted instantaneous channel estimate, for the weighted sum.

Alternatively, the step (c-2) includes using a modified weighted average channel estimation method of averaging the instantaneous channel estimate other than a value of a data position to be estimated, in calculating the APP of a symbol estimated from the APPs of decision bits of the channel decoding step (e), adding the APP as an extra weight to the instantaneous channel estimate in the resource block, and averaging the weighted instantaneous channel estimate, for the weighted sum.

When the traffic channel has resource blocks comprising consecutive time-frequency resources allowing a variation of channel in a time domain almost without a variation of channel in a frequency domain and is mapped into a multiple-pilot-based resource block having at least two inserted pilot symbols, the step (c-1) includes filtering the instantaneous pilot channel estimate to estimate a data channel, and the step (c-2) includes dividing a data channel received symbol by a modulation symbol estimated from the channel decoded bits to calculate an instantaneous data channel estimate, averaging instantaneous channel estimates for different frequency indices of a same time index in the resource block in a frequency domain, and filtering the average value in the time domain to estimate the channel.

In this case, the steps (c-1) and (c-2) include pre-determining an initial filter coefficient matrix set and a refining filter coefficient matrix set, respectively, according to the ranges of the SNR and the channel variation rate, selecting an initial filter coefficient matrix and a refining filter coefficient matrix for the received data packet according to the estimates of the SNR and the channel variation rate, and performing a filtering operation.

The steps (c-1) and (c-2) include estimating the channel parameters such as the SNR and the channel variation rate by using the instantaneous pilot channel estimates in a received data packet.

In still another aspect of the present invention, there is provided a method for OFDMA transmission and reception, which is for coherent detection in an uplink of a wireless communication system supporting multiple subscribers, the method including: a transmission process that includes (a) dividing the time-frequency resources of a time slot comprising a plurality of OFDM symbols into a plurality of traffic channels comprising a plurality of resource blocks well-distributed in the time and the frequency domain of the slot (b) generating pilot symbols according to resource-block-based resource mapping with a minimum resource unit being a resource block comprising consecutive subcarriers of consecutive OFDM symbols having at least one inserted pilot symbol for each traffic channel, and (c) processing the pilot symbols and channel-encoded and modulated data symbols by time-frequency mapping according to the resource-block-based mapping method to generate and transmit an OFDM signal; and a reception process that includes (d) processing the received OFDM signal according to the resource-block-based mapping method in the frequency domain, separating the received symbols by subscribers, and rearranging the separated symbols based on the resource block, and (e) performing iterative channel estimation, demodulation, and decoding by using the pilot symbols and data symbols estimated with the channel decoded bits after decoding for each traffic channel.

Consequently, for providing a resource allocation method and a channel estimation method for coherent detection in the uplink of an OFDMA system, the present invention allocates data in the units of resource blocks having a correlation large in the frequency and time domain for packet transmission of each subscriber in the uplink, and at least one inserted pilot symbol, so the channel estimation of the resource block can be achieved by using the pilot symbol in the initial stage and then the pilot symbol and data symbol estimated with channel decoded bits after channel decoding, thereby reducing the number of pilot symbols in the uplink for channel estimation by subscribers and enhancing the channel estimation performance without boosting the pilot transmission power.

In addition, the noise variance of the resource block is estimated by a resource-block by resource-block manner and the decoding metric is weighted by the estimated noise variance to mitigate the intercell interference better.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
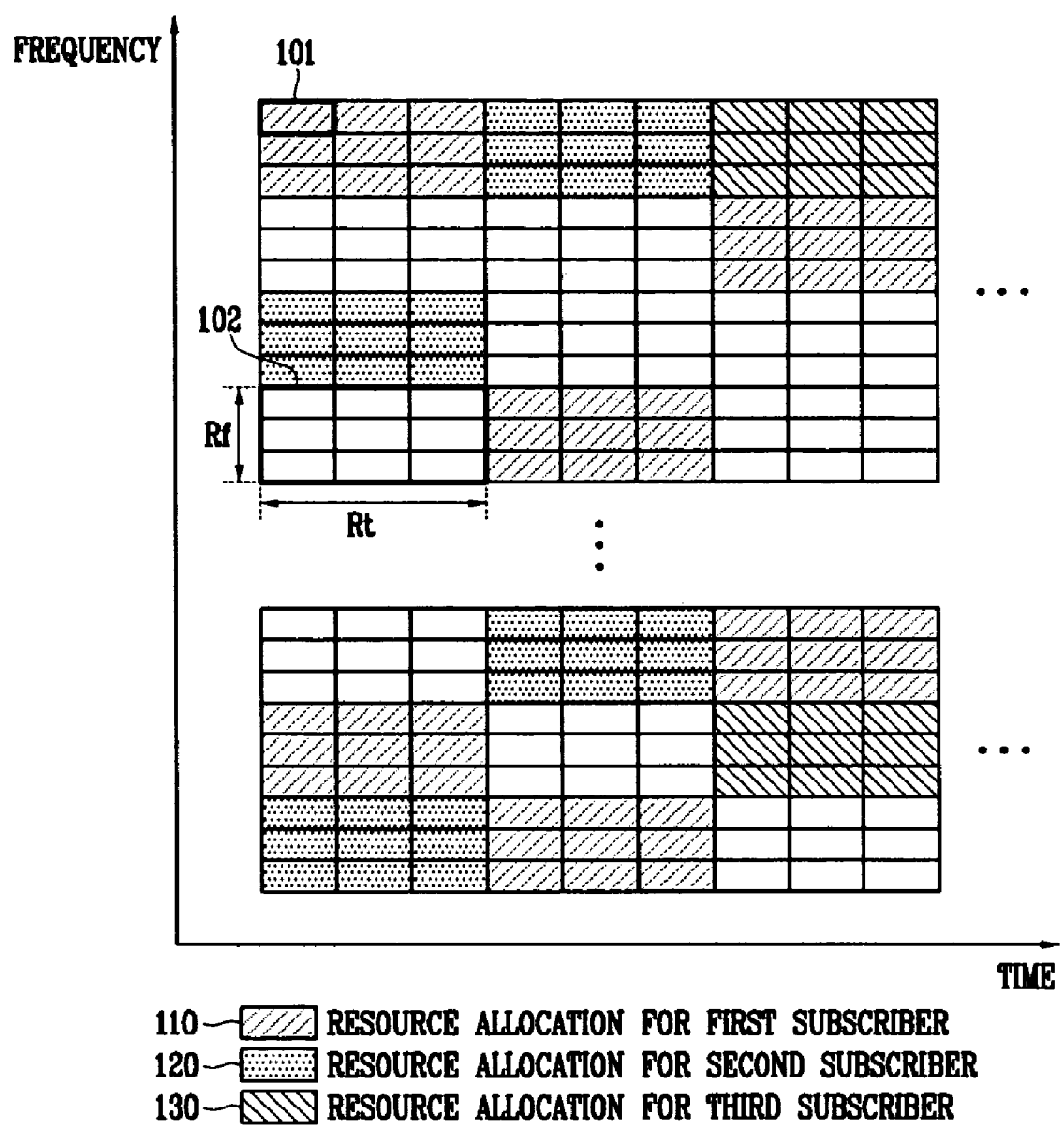
FIG. 1 is an exemplary illustration of allocating time-frequency resources to multiple subscribers in a method of OFDMA transmission and reception for coherent detection in the uplink according to an embodiment of the present invention.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

FIG. 1 is an exemplary illustration of allocating time-frequency resources to multiple subscribers in a method of OFDMA transmission and reception for coherent detection in the uplink according to an embodiment of the present invention.

One subcarrier in one OFDM symbol has a minimum time-frequency resource 101 constituting an OFDM symbol. The minimum unit of resource allocation for transmission of a subscriber data packet is $R_f$ consecutive subcarriers in $R_t$ consecutive OFDM symbols having at least one inserted pilot symbol so as to enable independent channel estimation. Namely, a resource block 102 including $R_t \times R_f$ time-frequency resources is the minimum unit of resource allocation.

The traffic channel comprising a plurality of resource blocks 110, 120, and 130 well-distributed in the time and frequency domain of the slot is allocated to a subscriber intending to transmit a data packet. Such an allocation of resource blocks 110, 120, and 130 distributed in the whole frequency band to every subscriber guarantees frequency diversity. The set of time-frequency indices of the resource blocks constituting the data channel is different from a data channel in the adjacent cells, so as to achieve intercell interference averaging to some degree.

As the resource blocks 110, 120, and 130 get larger, channel estimation becomes easier to achieve but the intercell interference averaging performance deteriorates. So, the size of resource blocks 110, 120, and 130 is preferably minimized.

Figure 2A:
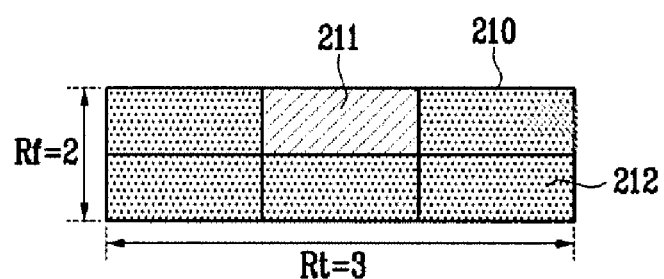
FIG. 2a is an exemplary illustration of using a resource block based on a single pilot symbol in a method of OFDMA transmission and reception for coherent detection in the uplink according to an embodiment of the present invention.

FIG. 2a is an exemplary illustration of using a resource block based on a single pilot symbol in a method of OFDMA transmission and reception for coherent detection in the uplink according to an embodiment of the present invention.

For example, a resource block 210 based on a single pilot symbol comprising six resources, where $R_t$ and $R_f$ are 3 and 2, respectively, and including one inserted pilot symbol 211 is preferable in construction when there is almost no variation of channel in the resource block. In this construction, the single pilot symbol 211 for the initial channel estimation is mapped to be in the center of the resource block 210, and data symbols 212 are mapped to be in the remaining areas of the resource block. Preferably, the values of $R_t$ and $R_f$ to make almost no variation of channel are determined to satisfy the following expression.

$$f_D T_s R_t \ll 1/2, \; \tau_{max} \Delta f R_f \ll 1/2 \qquad \text{[Equation 1]}$$

where $f_D$ is the maximum Doppler frequency of the channel; $T_s$ is the OFDM symbol interval; $\tau_{max}$ is the maximum delay time of the channel; and $\Delta f$ is the subcarrier spacing.

Figure 2B:
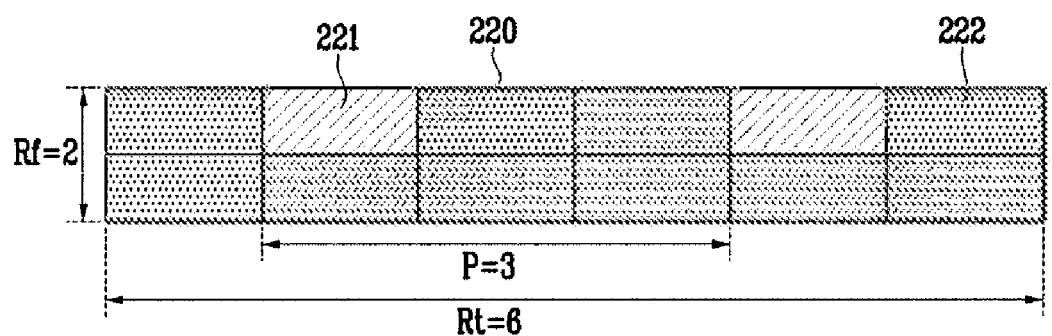
FIG. 2b is an exemplary illustration of mapping a resource block based on multiple pilot symbols in a method of OFDMA transmission and reception for coherent detection in the uplink according to an embodiment of the present invention.

FIG. 2b is an exemplary illustration of mapping a resource block based on multiple pilot symbols in a method of OFDMA transmission and reception for coherent detection in the uplink according to another aspect of the present invention, the resource block including two inserted pilot symbols.

In a specific system environment, the resource block having almost no variation of channel is extremely small in size, and the transmission efficiency greatly deteriorates when the pilot overhead exceeds 20% due to the small size of the resource block. In this case, a resource block 220 is preferred that allows a variation of channel in the time domain and has at least two inserted pilot symbols 221 in the time domain. An example of resource block mapping for the reduction of the pilot overhead is mapping data symbols 222 to a half of the pilot spacing in the time domain towards both ends of the resource block. Preferably, the pilot symbols 221 are of the same frequency position, and the time spacing P between the two pilot symbols 221 satisfies the following expression.

$$f_D T_s P < \tfrac{1}{2} \quad \text{[Equation 2]}$$

In accordance with another aspect of the present invention, the overhead caused by pilot power boosting and the intercell interference are reduced by making the pilot transmission power equal to the data transmission power. The deterioration of the channel estimation performance caused by not boosting the pilot transmission power is overcome by iteratively performing channel estimation, demodulation, and channel decoding in the reception method of the present invention, which will be described later.

Based on this aspect, the structure and operation of an apparatus for OFDMA transmission and reception according to an embodiment of the present invention is described in detail as follows.

Figure 3:
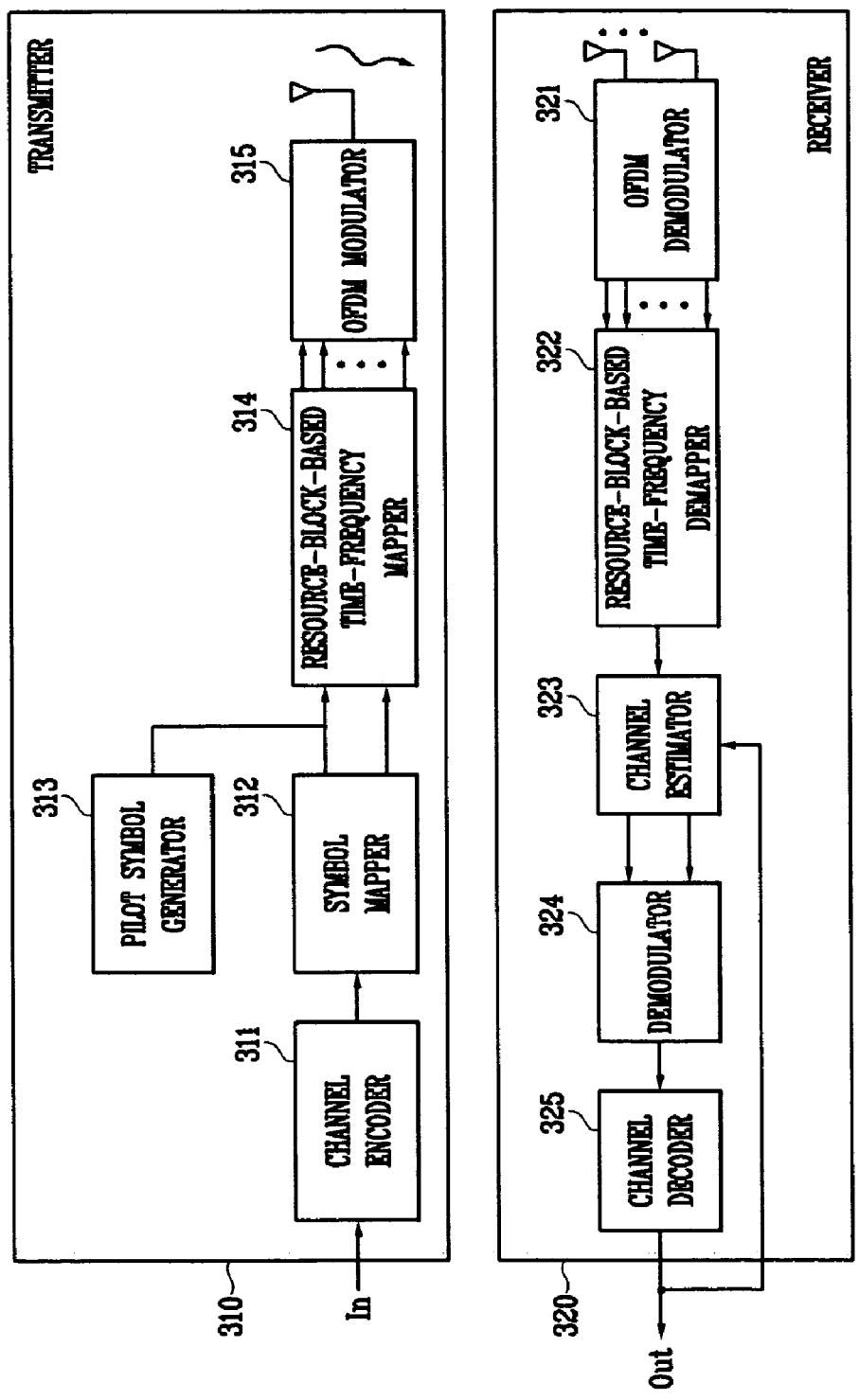
FIG. 3 is a schematic of an apparatus of OFDMA transmission and reception for coherent detection in the uplink according to an embodiment of the present invention.

FIG. 3 is a schematic of an apparatus for OFDMA transmission and reception for coherent detection in the uplink according to an embodiment of the present invention.

An OFDMA transmitter 310 for coherent detection in the uplink according to an embodiment of the present invention comprises, as shown in FIG. 3, a channel encoder 311, a symbol mapper 312, a pilot symbol generator 313, a resource-block-based time-frequency mapper 314, and an OFDM modulator 315.

The channel encoder 311 of the transmitter 310 encodes a subscriber data packet, and the symbol mapper 312 maps the encoded bits from the channel encoder 311 into modulation symbols.

The pilot symbol generator 313 generates pilot symbols of the equal power to the data transmission power according to resource mapping based on a resource block comprising at least one pilot symbol and multiple data symbols. The resource-block-based time-frequency mapper 314 maps subscriber data symbol outputs from the symbol mapper 312 and a pilot symbols generated from the pilot symbol generator 313 into a time-frequency index set of OFDM symbols allocated to a corresponding traffic channel according to a resource-block-based mapping method. The OFDM modulator 315 generates an OFDM signal according to the output of the resource-block-based time-frequency mapper 314.

On the other hand, a receiver 320, which receives a signal from the transmitter 310 of the above-stated structure, comprises an OFDM demodulator 321, a resource-block-based time-frequency demapper 322, a channel estimator 323, a demodulator 324, and a channel decoder 325.

The OFDM demodulator 321 converts OFDM received symbols at respective antennas to the received symbols in the frequency domain. The resource-block-based time-frequency demapper 322 separates the received symbols by subscribers according to the resource mapping method of the transmitter 310 for each subscriber, and rearranges the separated received symbols based on the resource block.

The channel estimator 323 performs channel estimation in the unit of resource blocks based on the output of the resource-block-based time-frequency demapper 322. In a first iteration, the channel estimator 323 estimates the channel of a corresponding resource block by using an instantaneous pilot channel estimates calculated by dividing the received pilot symbol of the OFDM demodulator 321 by the known pilot symbol. In subsequent iterations, the channel estimator 323 re-estimates the channel of the corresponding resource block by using both the instantaneous pilot channel estimates in the resource block and instantaneous data channel estimates calculated by using data modulation symbol estimated from a channel decoded bits.

The demodulator 324 uses the estimated channel of the channel estimator 323 to coherently calculate channel decoding input metrics, e.g., Euclidean distances or LLRs. The channel decoder 325 performs channel decoding using the metrics of the demodulator 324 according to a method used in the channel encoder 311.

In the receiver 320, the channel estimator 323, the demodulator 324, and the channel decoder 325 iterate their operations until the iteration count reaches the maximum iteration count or the decoding stop condition of the channel decoder 325, if any, is satisfied.

In the reception apparatus of the above-stated structure according to an embodiment of the present invention, the channel estimator 323 is variable in structure according to whether it uses a single-pilot-based resource block mapping method or a multiple-pilot-based resource block mapping method.

Figure 4:
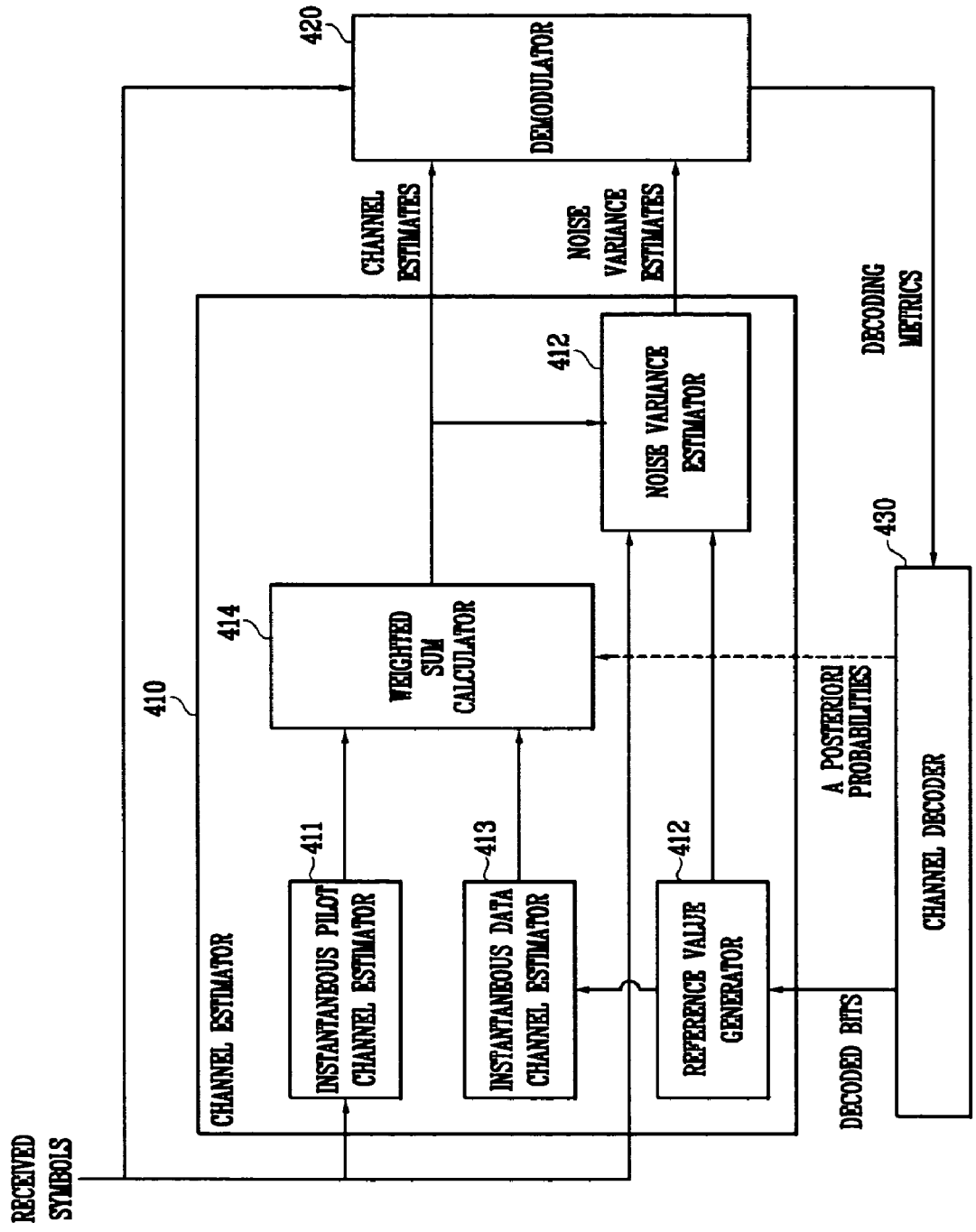
FIG. 4 is a schematic of a channel estimator for a method of mapping a resource block based on a single pilot symbol in the apparatus of OFDMA transmission and reception for coherent detection in the uplink according to an embodiment of the present invention.

FIG. 4 is a schematic of the channel estimator using a single-pilot-based resource block mapping method for signal transmission in the apparatus of OFDMA transmission and reception for coherent detection in the uplink according to an embodiment of the present invention.

Channel estimator 410 for a single-pilot-based resource block mapping method comprises, as shown in FIG. 4, an instantaneous pilot channel estimator 411, a reference symbol generator 412, an instantaneous data channel estimator 413, a weighted sum calculator 414, and a noise variance estimator 415.

The instantaneous pilot channel estimator 411 provides instantaneous pilot channel estimates by dividing received pilot symbols in the traffic channel by the known transmit pilot symbols, and the reference symbol generator 412 estimates transmitted modulation symbols from the decoded bits of a channel decoder 430 after one iteration is performed.

The instantaneous data channel estimator 413 divides the received symbols by the outputs of the reference symbol generator 412 to provide instantaneous data channel estimates. In the first iteration, the weighted sum calculator 414 transfers the instantaneous pilot channel estimate of a resource block to the demodulator 430 as a data channel estimate in the corresponding resource block. In subsequent iterations, the weighted sum calculator 414 estimates the channel by using the instantaneous pilot channel estimate and the instantaneous data channel estimates calculated according to any one of the following Equations 5 to 8 in the repeated channel estimation step subsequent to decoding. When calculating the weighted sum according to the Equation 7 or 8, the channel estimator 410 uses the APP of a modulation symbol estimated from the decoded bits and their APPs of the channel decoder 430.

Figure 5:
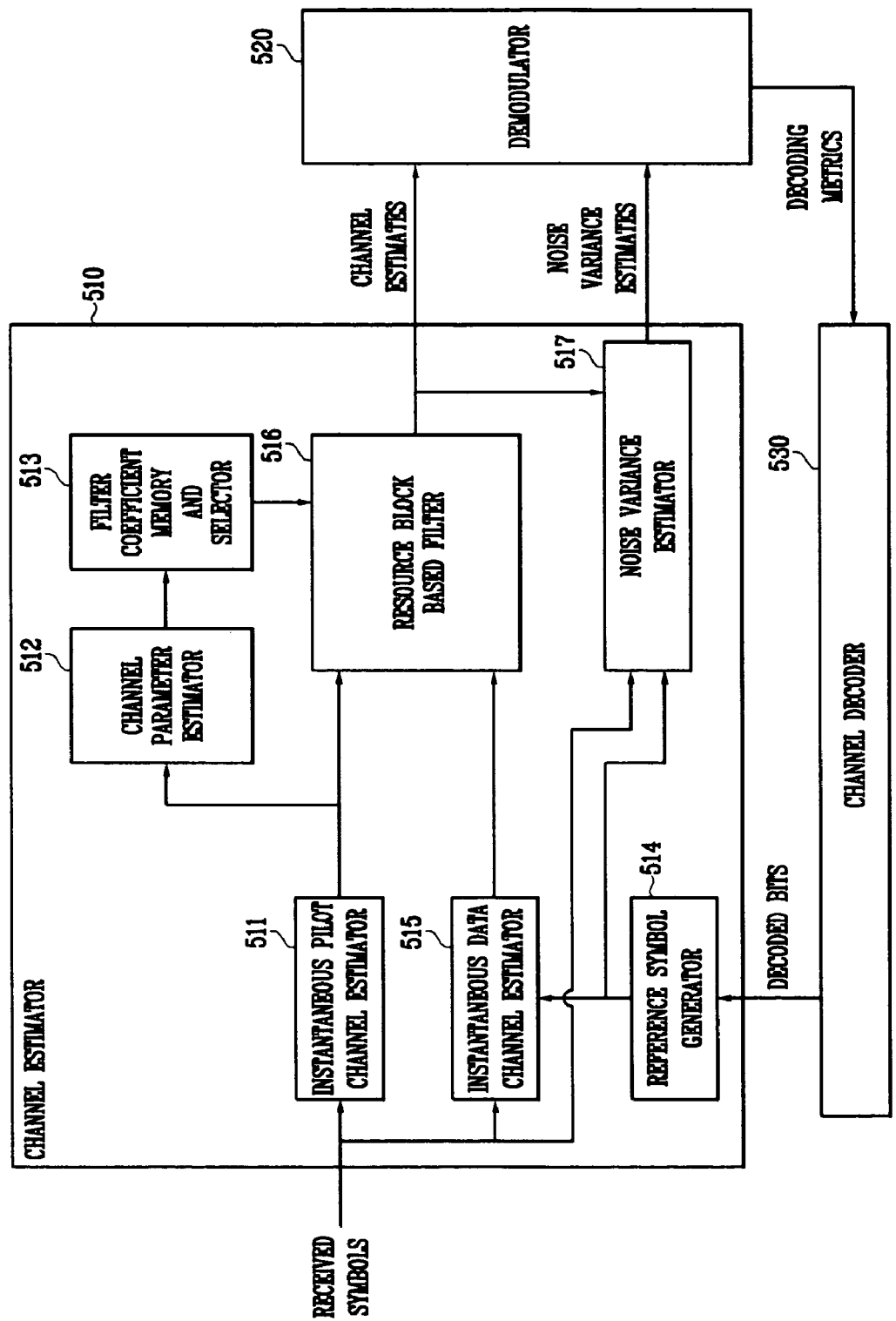
FIG. 5 is a schematic of a channel estimator for a method of mapping a resource block based on multiple pilot symbols in the apparatus of OFDMA transmission and reception for coherent detection in the uplink according to an embodiment of the present invention.

FIG. 5 is a schematic of the channel estimator using a multiple-pilot-based resource block mapping method for signal transmission in the apparatus of OFDMA transmission and reception for coherent detection in the uplink according to an embodiment of the present invention.

Channel estimator 510 for a multiple-pilot-based resource block mapping method comprises, as shown in FIG. 5, an instantaneous pilot channel estimator 511, a channel parameter estimator 512, a filter coefficient memory and selector 513, a reference symbol generator 514, an instantaneous data channel estimator 515, a resource-block-based filter 516, and a noise variance estimator 517.

The instantaneous pilot channel estimator 511 provides instantaneous pilot channel estimates by dividing the received pilot symbols in the traffic channel by the known transmit pilot symbols. The channel parameter estimator 512 estimates the SNR and the channel variation rate of the received traffic channel by estimating the average received power from the instantaneous pilot channel estimates at every pilot position in a corresponding received traffic channel, an initial noise variance, and a time-domain auto-correlation value at the adjacent pilot symbol positions.

The filter coefficient memory and selector 513 stores a pre-determined initial filter coefficient matrix set and a pre-determined refining filter coefficient matrix set according to the ranges of SNR and the channel variation rate values and selects a filter coefficient matrix based on the SNR estimate and the channel variation rate estimate. The reference symbol generator 514 estimates transmit symbols from the decision bits of a channel decoder 530. The instantaneous data channel estimator 515 generates an instantaneous data channel estimates from the output of the reference symbol generator 514.

In the first iteration, the resource-block-based filter 516 filters the output of the instantaneous pilot channel estimator 511 in the unit of resource block by using the initial filter coefficient matrix of the filter coefficient memory and selector 513. In subsequent iterations, the resource-block-based matrix 516 averages the outputs of the instantaneous pilot channel estimator 511 and the instantaneous data channel estimator 515 corresponding to a same time in the resource block, filters the averaged outputs in the unit of resource block by using the refining filter coefficient matrix provided by the filter coefficient memory and selector 513, and transmits the filtered outputs to a demodulator 520.

The noise variance estimator 415, 517 estimates, in the first iteration, the noise variance of the resource block, by using both the pilot symbols and the tentative hard decision data symbols determined by the received symbols and the output of the weighted sum calculator 414 or the resource-block-based filter 516 and estimates, in subsequent iterations, the same by using both the pilot symbols and the output of the reference symbol generator 412, 514.

Based on this structure, a method for OFDMA transmission and reception for coherent detection in the uplink according to an embodiment of the present invention is described as follows.

Figure 6A:
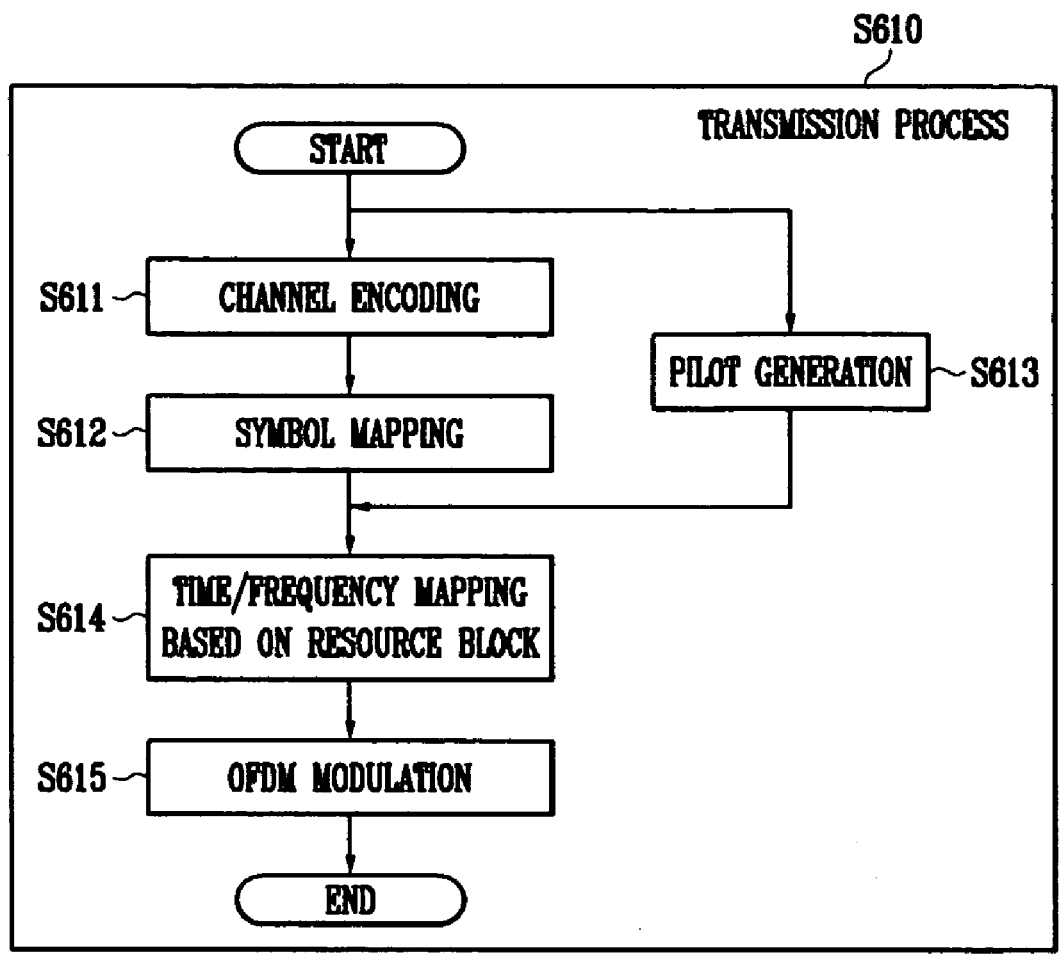
FIGS. 6a and 6b are flow charts showing the method of OFDMA transmission and reception for coherent detection in the uplink according to an embodiment of the present invention.
Figure 6B:
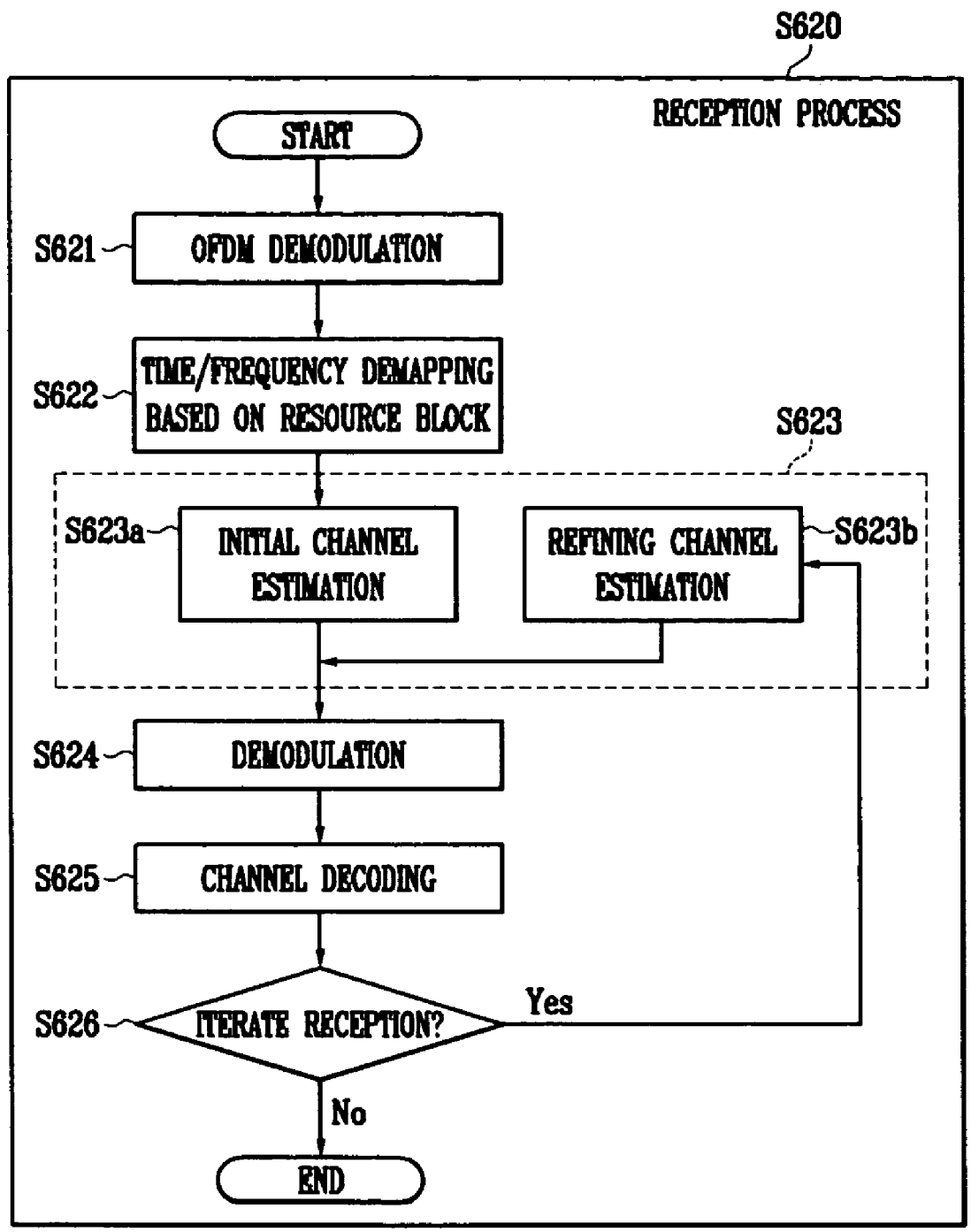

FIGS. 6a and 6b are flow charts of the method for OFDMA transmission and reception for coherent detection in the uplink according to an embodiment of the present invention, in which FIG. 6a shows a transmission method (S610) in a sequential manner and FIG. 6b shows a reception method (S620) in a sequential manner.

In the transmission method (S610), the channel encoder 311 channel-encodes a subscriber data packet to output a codeword, in step S611. The symbol mapper 312 maps the encoded bits into modulation symbols, in step S612. The pilot symbol generator 313 generates pilot symbols having the same intensity of the data transmission power according to a single-pilot- or multiple-pilot-based resource block mapping method, in step S613. The resource-block-based time-frequency mapper 314 maps the subscriber data and pilot symbols into the time-frequency index set of OFDM symbols in the slot according to the resource mapping method, in step S614.

Subsequently, the OFDM modulator 315 performs IFFT conversion and insertion of a guard interval for the output of the mapper 314 to generate an OFDM signal and transmits the generated OFDM signal to the receiver 320, in step S615.

Referring to FIG. 6b, in the reception method (S620), the OFDM demodulator 321 of the receiver 320 OFDM-demodulates OFDM received symbols at respective antennas into the received symbols in the frequency domain by removal of the guard interval and FFT conversion, in step S621.

The resource-block-based time-frequency demapper 322 separates the received symbols in the frequency domain by subscribers and rearranges the separated received symbols based on the resource block by a resource-block-based time-frequency demapping, according to the resource mapping method used in the aforementioned transmission step S610 of each subscriber, in step S622.

Subsequently, the channel estimator 323 estimates the channel in the unit of the resource block based on the output of the resource-block-based time-frequency demapping step S622, in step S623.

The demodulator 324 demodulates the received symbols with the outputs of the channel estimation step S623 to coherently generate channel decoding input metrics, e.g., Euclidean distances or LLRs, in step S624. The channel decoder 325 decodes the information bits from the input metrics using the channel decoding method corresponding to a channel encoding method, in step S625.

The channel estimator 323 determines in step S626 whether to iterate the reception process, when the decoding stop condition of the channel decoder 325 is not satisfied, or when the iteration count is less than the maximum number of iterations. The channel estimation step S623 comprises an initial channel estimation step S623a of estimating the channel of a corresponding resource block by solely using instantaneous pilot channel estimates in the resource block during a first iteration, and a refining channel estimation step S623b of re-estimating each data channel in the resource block by using the instantaneous pilot channel estimates and instantaneous data channel estimates calculated from the channel decoded bits in the resource block, and additional information available during subsequent iterations.

In the resource-block-based time-frequency demapping step S622, the received symbols for the subscriber data packet after the demapping step is given by the following Equation 3.

$$r(n,l)=h(n,l)x(n,l)+w(n,l) \quad \text{[Equation 3]}$$

where n is the time domain index; l is the frequency domain index; $r(n,l)$ ($=[r_1(n,l)r_2(n,l)\ldots r_M(n,l)]^T$) is a vector received at M receiver antennas; $h(n,l)$ ($=[h_1(n,l)h_2(n,l)\ldots h_M(n,l)]^T$) is a frequency channel response by receiving antennas; $x(n,l)$ is a pilot or data symbol transmitted to a corresponding position; and $w(n,l)$ ($=[w_1(n,l)w_2(n,l)\ldots w_M(n,l)]^T$) is the background noise by receiver antennas.

In the method for OFDM transmission and reception for coherent detection in the uplink according to an embodiment of the present invention, the channel estimation method is variable according to the type of the resource block mapping method.

First, the channel estimation method in the channel estimation step S623 for single-pilot-based resource block mapping is described below.

The channel estimation method in the initial channel estimation step S623a of the channel estimation step S623 includes estimating data channels by using an instantaneous pilot channel estimate $\tilde{h}(n_p,l_p)$ calculated by least square estimation at a pilot position $(n_p,l_p)$ of the resource block according to the following Equation 4.

$$\hat{h}(n, l) = \tilde{h}(n_p, l_p) = \frac{r(n_p, l_p)}{x(n_p, l_p)} \quad \text{[Equation 4]}$$

The refining channel estimation step S623b of the channel estimation step S623 includes estimating transmitted modulation symbols $\{\hat{x}(n,l)\}$ by using decision bits $\{\hat{b}_k\}$ after channel decoding as provided in the aforementioned channel decoding step S626, and calculating instantaneous data channel estimates in the resource block by least square estimation. More specifically, this estimation method is an average channel estimation method that estimates each data channel estimate by using an average instantaneous channel estimate in the resource block including the instantaneous pilot channel estimate according to the following Equation 5.

$$\hat{h}_{avg}(n, l) = \frac{1}{|I_{RB}|} \sum_{(n', l') \in I_{RB}} \tilde{h}(n', l') \quad \text{[Equation 5]}$$

$$\tilde{h}(n, l) = r(n, l) / \hat{x}(n, l), (n, l) \in I_{RB}$$

where $I_{RB}$ is a time-frequency index set constituting a resource block for channel estimation; and $|I_{RB}| = R_t R_f$ is the number of elements in the set $I_{RB}$, and it is given as $\hat{x}(n_p, l_p) = x(n_p, l_p)$ at the pilot position. In this manner, the instantaneous data channel estimate is calculated by using decision bits after channel decoding to reduce a probability of erroneous decision. Also, the instantaneous pilot channel estimate in the resource block and the instantaneous data channel estimates are averaged for the reduction of channel estimation errors that may occur in channel estimation using the pilot symbol. Accordingly, the effect of the pilot transmission power greater than the data transmission power can be obtained without boosting the pilot transmission power.

Another method of estimating channels in the resource block in the above-stated refining channel estimation step S623b is a modified average channel estimation method according to the following Equation 6, where the instantaneous channel estimate for a data position to be estimated is excluded in averaging the instantaneous channel estimate in the resource block.

$$\hat{h}_{mavg}(n, l) = \frac{1}{|I_{RB}| - 1} \sum_{(n', l') \in I_{RB}/(n,l)} \tilde{h}(n', l') \quad \text{[Equation 6]}$$

where $I_{RB}/(n,l)$ is the set formed by $I_{RB}$ excluding the element (n,l). The average channel estimation method of the Equation 5 may have relatively less complexity by using the same channel estimate for the data fields comprising a resource block. But, it causes error propagation in that the previous channel decoding error affects the results of channel estimation, demodulation, and decoding in the subsequent steps, by introducing a previous decoding decision for the data to be demodulated in the re-estimated data channel estimate. According to the Equation 6, the modified average channel estimation method that provides a different value to each data position increases the complexity but reduces the effect of error propagation.

In the method for OFDMA transmission and reception for coherent detection in the uplink according to an embodiment of the present invention, another refining channel estimation method can also be used that employs a single-pilot-based resource block mapping method and provides the APPs $\{p(\hat{b}_k)\}$ for decision bits $\{\hat{b}_k\}$ after channel decoding in the above-stated channel decoding step S626.

The refining channel estimation method using APPs is a weighted average channel estimation method that uses the APP as a reliability of a data symbol estimation. The weighted average channel estimation method includes calculating the APPs $\{p(\hat{x}(n,l))\}$ of the data symbol estimates from the bit probabilities after decoding, multiplying the calculated APP by the instantaneous channel estimate as a reliability for channel estimation at a data position, and averaging the multiplication result, as expressed by the following Equation 7.

$$\hat{h}_{wavg}(n, l) = \frac{1}{\sum_{(n', l') \in I_{RB}} p(\hat{x}(n, l))} \sum_{(n', l') \in I_{RB}} p(\hat{x}(n', l'))\tilde{h}(n', l') \quad \text{[Equation 7]}$$

Here, the reliability for pilot channel estimation is constantly "1" because the pilot symbol at a pilot position is already known. By including the APPs of the estimated data symbols after decoding in this manner, the channel estimation errors caused by the estimated data symbols having a high probability of erroneous estimation can be reduced. The channel coding method compatible with this channel estimation method includes decoders of turbo codes and low-density parity check codes, etc.

To prevent error propagations in the weighted average channel estimation method, a modified average channel estimation method according to the following Equation 8 can be used.

$$\hat{h}_{mwavg}(n, l) = \frac{1}{\sum_{(n', l') \in I_{RB}/(n,l)} p(\hat{x}(n', l'))} \sum_{(n', l') \in I_{RB}/(n,l)} p(\hat{x}(n', l'))\tilde{h}(n', l') \quad \text{[Equation 8]}$$

Now, a description is given as to a channel estimation method of the channel estimation step S623 for multiple-pilot-based resource block mapping in the method for OFDMA transmission and reception for coherent detection in the uplink according to an embodiment of the present invention.

The initial channel estimation method S623a of the above-stated channel estimation step S623 can be expressed by the following Equation 9.

$$\hat{h}_{filter}(n, l) = \sum_{n' \in T_p} g_{n'}^{Pilot}(n)\tilde{h}(n', l') \quad \text{[Equation 9]}$$

where $T_p$ is a time index set of pilot symbols in the resource block; and the matrix $G^p$ with its (n,n')th element $g_{n'}^{Pilot}(n)$ is an initial filter coefficient matrix when using the instantaneous pilot channel estimates solely.

The refining channel estimation method S623b of the above-stated channel estimation step S623 can be expressed by the following Equation 10.

$$\hat{h}_{filter}(n, l) = \sum_{n' \in T_{RB}} g_{n'}(n) \left[ \frac{1}{R_f} \sum_{l' \in F_{RB}} \tilde{h}(n', l') \right] \quad \text{[Equation 10]}$$

where $T_{RB}$ is a time index set of resources in the resource block; $F_{RB}$ is a frequency index set of resources in the resource block; and the matrix G with its (n,n')th element $g_{n'}(n)$ is a refining filter coefficient matrix when using both the instantaneous pilot channel estimates and the instantaneous data channel estimates in the resource block.

The embodiment of the present invention determines the size of the resource block that causes almost no variation of channel in the frequency domain, and uses a smoothing filter for calculating an average in the frequency domain and incorporating the effect of time variation in the time domain. The filter coefficient matrix is dependent upon the temporal position of the channel to be estimated, rather than the frequency position of the channel. A set of filter coefficient matrices adequate to some typical channel variation rates and SNR values is determined in advance and stored in the memory, and a proper filter coefficient matrix is selected from the set of filter coefficient matrices according to the estimated channel variation rate and SNR value. In the embodiment of the present invention, the filter coefficient matrix has a characteristic of averaging the instantaneous channel estimates available in the resource block at a low SNR or a low channel variation rate, or interpolating the instantaneous channel estimates available in the resource block by incorporating the channel variation characteristics at a high SNR or a high channel variation rate.

In the channel estimation step S623, a determination method for $G^P$ and G is the linear least mean square error estimation method. Another determination method for $G^P$ and G includes designing an FIR (Finite Impulse Response) filter for a low-pass filtering function according to a Doppler frequency.

Namely, the method includes calculating FIR filter coefficient matrices for several typical Doppler frequencies, and selecting an appropriate filter coefficient matrix according to an SNR estimate and a channel variation rate estimate during a channel estimation. The aforementioned filter coefficient calculation method by linear least mean square error estimation requires an assumption for the autocorrelation function of the channel, whereas this method can be used without information about the autocorrelation function of the channel.

The channel variation rate estimate for selection of the filter coefficient matrices can be calculated according to the auto-correlation correlation function between pilot positions using instantaneous pilot channel estimates, such as given by the following Equation 11, for example.

$$\frac{E\{\tilde{h}_m(n, l)\tilde{h}_m(n+P, l)^*\}}{E\{|\tilde{h}_m(n, l)|^2\}} = \quad \text{[Equation 11]}$$

$$Re \left\{ \frac{\frac{1}{|F_p|(|T_p|-1)M} \sum_{k \in F_p} \sum_{n \in T'_p} \sum_{m=1}^{M} \tilde{h}_m(n, l)\tilde{h}_m(n+P, l)^*}{\frac{1}{|F_p||T_p|M} \sum_{k \in F_p} \sum_{n \in T_p} \sum_{m=1}^{M} |\tilde{h}_m(n, l)|^2 - \hat{\sigma}_w^2} \right\}$$

where Re{x} is the real number of x; $F_p$ is the frequency index for a pilot position of every resource block allocated to a subscriber data block; $T_p$ is a set formed from $T_p$ excluding the right-end time index of the pilot position in the traffic channel; and $\hat{\sigma}_w^2 = E\{w_m(n,k)w_m(n,k)^*\}$ is the initial average noise variance estimate of the received traffic channel. The initial average noise variance estimate is calculated by estimating the additive noise variance during an initial system operation, or using a preamble additionally allocated for the purpose of timing or frequency offset estimation, or using the received symbols of the other traffic channels which are not assigned for data transmission, which specific estimation methods will not be described here in detail.

The channel variation rate estimate according to the Equation 11 is an estimated autocorrelation function of the channel that has a value approximate to "1" with a small variation of channel and less than "1" with a large variation of channel.

The SNR estimate for selection of the filter coefficient matrix is calculated using the instantaneous pilot channel estimates according to the following Equation 12.

$$\hat{SNR} = \frac{\left[ \frac{1}{|F_p||T_p|M} \sum_{k \in F_p} \sum_{n \in T_p} \sum_{m=1}^{M} |\tilde{h}_m(n, k)|^2 - \hat{\sigma}_w^2 \right]}{\hat{\sigma}_w^2} \quad \text{[Equation 12]}$$

where the numerator is the same as the numerator in the channel variation rate estimate equation, the Equation 11.

The channel estimation method in the initial channel estimation step S623a of the channel estimation step S623 further includes estimating the noise variance of each resource block by using the channel estimates $\tilde{h}(n,k)$ obtained by Equation 4 or 9, the pilot symbols, and the tentatively decided modulation symbols $\hat{x}_d(n,k)$ from the received symbols and the channel estimates such that $$\hat{x}(n, k) = \min_{x(n,k)} \sum_{m=1}^{M} |r_m(n, k) - \hat{h}_m(n, k)x(n, k)|^2,$$

of the resource block according to the following Equation 13.

$$\sigma^2(\hat{n}, k) = \frac{1}{|I_{RB}|M} \sum_{(n,k) \in I_{RB}} \quad \text{[Equation 13]}$$

$$\sum_{m=1}^{M} |r_m(n, k) - \hat{h}_m(n, k)\hat{x}(n, k)|^2$$

where $\hat{x}(n,k)$ represents the pilot position.

The refining channel estimation step S623b of the channel estimation step S623 further includes re-estimating the noise variance of each resource block by using channel estimates $\tilde{h}(n,k)$ obtained by Equation 5, 6, 7, 8, or 10, the pilot symbols, and the modulation symbols $\hat{x}(n,k)$ estimated from the decoded bits of Step S625 in Equation 13. The estimated noise variance is the same for the resource blocks in the same resource block.

The demodulation step S624 includes the computation of the decoding metrics such as Euclidean distance or LLR with the channel estimate and the estimated noise variance obtained at the channel estimation step S623 at the data positions. One exemplary method of computing LLR for the gray-mapped QPSK is achieved according to Equation 14.

$$\Lambda(x^0(n,k)) = \frac{2\sqrt{2}\,\text{Re}\{\hat{h}^H(n,k)r(n,k)\}}{\sigma^2(n,k)},$$

$$\Lambda(x^1(n,k)) = \frac{2\sqrt{2}\,\text{Im}\{\hat{h}^H(n,k)r(n,k)\}}{\sigma^2(n,k)}$$

[Equation 14]

where $x^i(n,k)$ denotes the ith constituent bit of the symbol $x(n,k)$, Im{ } denotes the imaginary part of a complex value, and H denotes the Hermitian transpose.

To overcome the difficulty of channel estimation and enable coherent detection in applying OFDMA in the uplink, the present invention provides a method for OFDMA transmission and reception, and an apparatus thereof, which allocates resource blocks comprising consecutive subcarriers of consecutive OFDM symbols having at least one inserted pilot symbol in the unit of minimum resource, achieves channel estimation in the unit of resource block, and performs repeated channel estimation and demodulation using the data reference value after decoding, and channel decoding, thereby enhancing a channel estimation performance without boosting the pilot transmission power.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As described above, the present invention achieves frequency diversity or intercell interference averaging to enhance the channel estimation performance without boosting the pilot transmission power in a method for OFDMA transmission and reception in the uplink of a wireless communication system supporting multiple subscribers.

The present invention also enables coherent detection without boosting the pilot transmission power so as to reduce the pilot overhead and the intercell interference caused by pilot boosting, and facilitates the use of a higher-order modulation system to enhance the data transmission efficiency.

What is claimed is:

1. An apparatus for OFDMA (Orthogonal Frequency Division Multiple Access) transmission, which is for coherent detection in an uplink of a wireless communication system supporting multiple subscribers, the apparatus comprising:
a channel encoder for channel-encoding a subscriber data block;
a symbol mapper for mapping encoded data of the channel encoder into a data symbol;
a pilot symbol generator for generating a pilot symbol, the pilot symbol having the same transmission power as the data symbol;
a resource-block-based time-frequency mapper for mapping the data symbol output from the symbol mapper and the pilot symbol from the pilot symbol generator into a time-frequency index of an OFDM signal according to a resource-block-based mapping method, the resource-block-based mapping method mapping multiple resource blocks that are well-distributed in time and frequency domains to a channel allocated to a subscriber, each resource block comprising consecutive subcarriers of consecutive OFDM symbols and including at least one pilot symbol and multiple data symbols; and
an OFDM modulator for generating an OFDM signal from the mapped output of the resource-block-based time-frequency mapper,
wherein each resource block includes a single pilot symbol at the center of the resource block, the size of the resource block determined by $R_f \times R_t$, where $R_f$ and $R_t$ satisfy the following expressions:
$f_D T_s R_t << \frac{1}{2}$, and $\tau_{max} \Delta f / R_f << \frac{1}{2}$, where $f_D$ is a maximum Doppler frequency of the channel, $T_s$ is a symbol interval, and $\tau_{max}$ is the maximum delay time of the channel, and $\Delta f$ is the subcarrier spacing,
or each resource block includes multiple pilot symbols located at the same frequency and spaced in the time domain by a time spacing P determined by the following expression:

$f_D T_s P < \frac{1}{2}$.

2. The apparatus as claimed in claim 1, wherein the resource-block-based mapping method includes a single-pilot-based resource block mapping method or a multiple-pilot-based resource block mapping method.

3. An apparatus for OFDMA reception, which is for coherent detection in an uplink of a wireless communication system supporting multiple subscribers, the apparatus comprising:
an OFDM demodulator for converting OFDM received symbols at respective antennas into frequency-domain received symbols, the OFDM received symbol including a pilot symbol that has the same transmission power as a data symbol;
a resource-block-based time-frequency demapper for separating the frequency-domain received symbols of the OFDM demodulator by subscribers according to a resource mapping method for each subscriber, and rearranging the separated frequency-domain received symbols based on a resource block, the resource mapping method mapping multiple resource blocks that are well-distributed in time and frequency domains to each subscriber, each resource block comprising consecutive subcarriers of consecutive OFDM symbols;
a channel estimator for estimating a channel in units of resource blocks based on the output of the resource-block-based time-frequency demapper, wherein the channel estimator estimates, at a first iteration, the channel of a corresponding resource block based on a pilot channel estimate obtained by dividing the received pilot symbol output from the OFDM demodulator by a given pilot symbol and refines the estimated channel based on the pilot channel estimate and a data channel estimate in subsequent iterations;
a demodulator for coherently calculating a channel decoding input metric by using the channel estimate of the channel estimator; and
a channel decoder for performing channel decoding by using the calculated metric of the demodulator according to a channel encoding methods
wherein when using a single-pilot-based resource block having the pilot inserted in the center of the resource block, the channel estimator comprises:
an instantaneous pilot channel estimator for calculating an instantaneous pilot channel estimate;
a symbol mapper for estimating a transmit symbol from the output bit of the channel decoder;

an instantaneous data channel estimator for calculating an instantaneous data channel estimate by using the output of the symbol mapper;

a weighted sum calculator for transmitting the instantaneous pilot channel estimate as a channel value of the resource block in a first iteration, and calculating a weighted sum in the resource block according to a channel estimation method from the outputs of the instantaneous pilot channel estimator and the instantaneous data channel estimator in the subsequent iterations; and a noise variance estimator for calculating the noise variance of the received symbols in the resource block.

4. The apparatus as claimed in claim 3, wherein the channel estimator estimates, at the first iteration, the channel of the corresponding resource block by using an instantaneous pilot channel estimate calculated by dividing the frequency-domain received pilot symbol output from the OFDM demodulator by the given pilot symbol, and estimates, in the subsequent iterations, the channel of the corresponding resource block by using both the instantaneous pilot channel estimate of the initial channel estimator in the resource block and the instantaneous data channel estimate calculated by using the decision symbols estimated from channel decoding decision bits.

5. The apparatus as claimed in claim 3, wherein the channel decoding input metric includes a Euclidean distance or a log-likelihood ratio.

6. The apparatus as claimed in claim 3, wherein the channel estimation method of the weighted sum calculator is selected from the group including an average channel estimation method, a weighted average channel estimation method, a modified average channel estimation method, and a modified weighted average channel estimation method.

7. The apparatus as claimed in claim 3, wherein when using a resource block having multiple inserted pilots, the channel estimator comprises:

an instantaneous pilot channel estimator for calculating an instantaneous pilot channel estimate;

a channel parameter estimator for estimating an SNR (signal-to-noise ratio) and a channel variation rate of a received packet using the instantaneous pilot channel estimates;

a filter coefficient memory and selector for selecting an initial filter coefficient matrix and a refining filter coefficient matrix with the outputs of the channel parameter estimator from the filter coefficient vector set calculated and stored in advance according to given levels of the SNR and the channel variation rate;

a reference symbol generator for estimating a transmit symbol from the decision bit of the channel decoder;

an instantaneous data channel estimator for generating an instantaneous data channel estimate from the output of the reference symbol generator;

a resource-block-based filter for performing a filtering operation in the units of resource block according to an initial filter coefficient matrix provided by the filter coefficient memory and selector; and a noise variance estimator for calculating the noise variance of the received symbols in the resource block.

8. The apparatus as claimed in claim 7, wherein the resource-block-based filter filters, in the first iteration, the output of the instantaneous pilot channel estimator in the units of resource block according to the initial filter coefficient matrix provided by the filter coefficient memory and selector, and averages, in the subsequent iterations, the outputs of the instantaneous pilot channel estimator and the instantaneous data channel estimator corresponding to a same time in the resource block and filters the averaged outputs according to the refining filter coefficient matrix provided by the filter coefficient memory and selector.

9. A method for OFDMA transmission, which is for coherent detection in an uplink of a wireless communication system supporting multiple subscribers, the method comprising:

(a) channel-encoding a subscriber data block;

(b) mapping the encoded data into a data symbol;

(c) generating a pilot symbol, the pilot symbol having the same transmission power as the data symbol;

(d) mapping the symbol-mapped data symbol and the generated pilot symbol into a time-frequency index of an OFDM symbol according to a resource-block-based mapping method, the resource-block-based mapping method mapping multiple resource blocks that are well-distributed in time and frequency domains to a channel allocated to a subscriber, each resource block comprising consecutive subcarriers of consecutive OFDM symbols and including at least one pilot symbol and multiple data symbols; and (e) generating an OFDM signal from the output of the time-frequency mapping step and transmitting the generated OFDM signal, wherein each resource block includes a single pilot symbol at the center of the resource block, the size of the resource block determined by $R_f \times R_t$, where $R_f$ and $R_t$ satisfy the following expressions:

$f_D T_s R_t << \frac{1}{2}$, and $\tau_{max} \Delta f / R_f << \frac{1}{2}$, where $f_D$ is a maximum Doppler frequency of the channel. $T_s$ is a symbol interval, and $\tau_{max}$ is the maximum delay time of the channel, and $\Delta f$ is the subcarrier spacing, or each resource block includes multiple pilot symbols located at the same frequency and spaced in the time domain by a time spacing P determined by the following expression:

$f_D T_s P < \frac{1}{2}$.

10. A method for OFDMA reception, which is for coherent detection in an uplink of a wireless communication system supporting multiple subscribers, the method comprising:

(a) converting OFDM received symbols at respective antennas into frequency-domain received symbols by OFDM demodulation, the OFDM received symbol including a pilot symbol that has the same transmission power as a data symbol;

(b) separating the frequency-domain received symbols by subscribers according to a resource mapping method of each subscriber, and rearranging the separated frequency-domain received symbols based on a resource block by resource-block-based demapping, the resource mapping method mapping multiple resource blocks that are well-distributed in time and frequency domains to each subscriber, each resource block comprising consecutive subcarriers of consecutive OFDM symbols;

(c) estimating a channel in units of resource blocks by using the output of the time-frequency demapping, wherein the channel of a corresponding resource block is estimated, at a first iteration, based on a pilot channel obtained by dividing the received pilot symbol output from the OFDM demodulation by a given pilot symbol and is refined based on the pilot channel and a data channel estimate in subsequent iterations;

(d) coherently generating a channel decoding input metric from the received symbol, the estimated channel, and the estimated noise variance by demodulation;

(e) channel-decoding based on the generated metric according to a channel encoding method; and (f) determining whether to repeat a reception process when a decoding stop condition provided in the channel decoding step is not satisfied, or when a iteration count is less than a maximum iteration counts
wherein when using a single-pilot-based resource block having the pilot inserted in the center of the resource block, estimating the channel in (c) comprises:
estimating an instantaneous pilot channel for calculating an instantaneous pilot channel estimate;
mapping a symbol for estimating a transmit symbol from the output bit of the channel decoder;
estimating an instantaneous data channel for calculating an instantaneous data channel estimate by using output of symbol mapping;
calculating a weighted sum for transmitting the instantaneous pilot channel estimate as a channel value of the resource block in a first iteration, and calculating a weighted sum in the resource block according to a channel estimation method from the instantaneous pilot channel estimate and the instantaneous data channel estimate in the subsequent iterations; and
estimating a noise variance for calculating the noise variance of the received symbols in the resource block.

11. The method as claimed in claim 10, wherein the step (c) comprises:
(c-1) performing an initial channel estimation in the first iteration to estimate the channel of the corresponding resource block by using an instantaneous pilot channel estimate calculated by dividing the frequency-domain received pilot symbol of the time-frequency demapping by the given pilot symbol, and to estimate a noise variance of a corresponding resource block by using given pilot symbols and tentatively decided data symbols from received symbols and channel estimates; and
(c-2) performing a refining channel estimation in the subsequent iterations to estimate the channel of the corresponding resource block by using both the instantaneous pilot channel estimate in the resource block and an instantaneous data channel estimate calculated by using a data modulation symbol estimated from channel decoded bits and to estimate the noise variance of the corresponding resource block by using pilot symbols and data symbols estimated from channel decoded bits.

12. The method as claimed in claim 11, wherein when the received symbol has a resource block comprising multiple consecutive time-frequency resources almost without a variation of channel and has a single-pilot-based resource block having a pilot symbol inserted in the center of the resource block
the step (c-1) includes using the single instantaneous pilot channel estimate in the resource block as a data channel estimate in the resource block, and
the step (c-2) includes estimating the data channel by using a weighted sum of the instantaneous pilot channel estimate and the instantaneous data channel estimate.

13. The method as claimed in claim 12, wherein the step (c-2) includes estimating the data channel by an average channel estimation method of averaging all instantaneous channel estimates in the resource block, for the weighted sum.

14. The method as claimed in claim 12, wherein the step (c-2) includes estimating the data channel by a modified average channel estimation method of averaging all instantaneous channel estimates other than the instantaneous channel estimate of the data channel to be estimated, for the weighted sum.

15. The method as claimed in claim 12, wherein the step (c-2) includes estimating the data channel by a weighted average channel estimation method of calculating the APP of a modulation symbol estimated from the APPs of the decision bits of the channel decoding step (e), adding the APP of a modulation symbol as an extra weight to the instantaneous channel estimate in the resource block, and averaging the weighted instantaneous channel estimate, for the weighted sum.

16. The method as claimed in claim 12, wherein the step (c-2) includes using a modified weighted average channel estimation method of averaging the instantaneous channel estimate other than a value of a data position to be estimated, in calculating the APP of a symbol estimated from the APPs of decision bits of the channel decoding step (e), adding the APP as an extra weight to the instantaneous channel estimate in the resource block, and averaging the weighted instantaneous channel estimate, for the weighted sum.

17. The method as claimed in claim 11, wherein when the received symbol has a resource block comprising consecutive time-frequency resources allowing a variation of channel in a time domain almost without a variation of channel in a frequency axis and is mapped into a multiple-pilot-based resource block having at least two inserted pilot symbols,
the step (c-1) includes filtering the instantaneous pilot channel estimate to estimate a data channel, and
the step (c-2) includes dividing a data channel received symbol by a modulation symbol estimated from the channel decoded bits to calculate an instantaneous data channel estimate, averaging instantaneous channel estimates for different frequency indices of a same time index in the resource block in a frequency axis, and filtering the average value in the time domain to estimate the channel.

18. The method as claimed in claim 17, wherein the steps (c-1) and (c-2) include determining an initial filter coefficient matrix set and a refining filter coefficient matrix set, respectively, according to the ranges of the SNR and the channel variation rate, selecting an initial filter coefficient vector and a refining filter coefficient matrix for the received data packet according to the estimates of the SNR and the channel variation rate, and performing a filtering operation.

19. The method as claimed in claim 18, wherein the steps (c-1) and (c-2) include estimating the channel parameters including the SNR and the channel variation rate by using the instantaneous pilot channel estimates in a received data packet.

20. A method for OFDMA transmission and reception, which is for coherent detection in an uplink of a wireless communication system supporting multiple subscribers, the method comprising:
a transmission process comprising (a) dividing time-frequency resources of a time slot comprising a plurality of orthogonal frequency division multiplexing symbols into a plurality of traffic channels, each traffic channel comprising a plurality of resource blocks that are well-distributed in time and frequency domains of the time slot, (b) generating pilot symbols according to a resource-block-based resource mapping method with a minimum resource unit being one of the resource blocks, each resource block comprising consecutive subcarriers of consecutive OFDM symbols having at least one inserted pilot symbol for each traffic channel, and (c) processing the pilot symbols and channel-encoded and modulated data symbols by time-frequency mapping according to the resource-block-based mapping method to generate and transmit an OFDM signal, wherein each resource block includes a single pilot symbol at the center of the resource block, the size of the resource block determined by $R_f \times R_t$, where $R_f$ and $R_t$ satisfy the following expressions:

$f_D T_s R_t << \frac{1}{2}$, and $\tau_{max} \Delta f / R_f \frac{1}{2}$, where $f_D$ is a maximum Doppler frequency of the channel, $T_s$ is a symbol interval, and $\tau_{max}$ is the maximum delay time of the channel, and $\Delta f$ is the subcarrier spacing, or each resource block includes multiple pilot symbols located at the same frequency and spaced in the time domain by a time spacing P determined by the following expression:

$f_D T_s P < \frac{1}{2}$;

and a reception process comprising (d) processing the received OFDM signal according to the resource-block-based mapping method in the frequency domain, separating the received symbols by subscribers, and rearranging the separated symbols based on the resource block, and (e) performing iterative channel estimation, demodulation, and decoding by using the pilot symbols and data symbols estimated with the channel decoded bits after decoding for each traffic channel, wherein the traffic channel of a corresponding resource block is estimated, at a first iteration, based on a pilot channel estimate obtained by dividing the received pilot symbol output from the demodulation by a given pilot symbol and is refined based on the pilot channel and a data channel estimate in subsequent iterations.

* * * * *